United States Patent
Minto

(10) Patent No.: US 10,676,154 B2
(45) Date of Patent: Jun. 9, 2020

(54) FRONT DERAILLEUR FOR A BICYCLE

(71) Applicant: Campagnolo S.r.l., Vicenza (IT)

(72) Inventor: Marco Minto, Mirano (IT)

(73) Assignee: Campagnolo S.r.l., Vicenza (IT)

( * ) Notice: Subject to any disclaimer, the term of this patent is extended or adjusted under 35 U.S.C. 154(b) by 350 days.

(21) Appl. No.: 15/892,814

(22) Filed: Feb. 9, 2018

(65) Prior Publication Data

US 2018/0229804 A1    Aug. 16, 2018

(30) Foreign Application Priority Data

Feb. 13, 2017    (IT) .................. 102017000015324

(51) Int. Cl.
| | |
|---|---|
| *B62M 9/1342* | (2010.01) |
| *B62M 9/1348* | (2010.01) |
| *B62M 9/131* | (2010.01) |
| *B62M 9/135* | (2010.01) |
| *B62M 9/136* | (2010.01) |
| *B62M 25/02* | (2006.01) |

(52) U.S. Cl.
CPC .......... *B62M 9/1342* (2013.01); *B62M 9/131* (2013.01); *B62M 9/135* (2013.01); *B62M 9/136* (2013.01); *B62M 9/1348* (2013.01); *B62M 25/02* (2013.01)

(58) Field of Classification Search
CPC .... B62M 9/132; B62M 25/08; B62M 9/1342; B62M 9/1348; B62M 9/137
USPC .......................................................... 474/82
See application file for complete search history.

(56) References Cited

U.S. PATENT DOCUMENTS

| | | | | |
|---|---|---|---|---|
| 4,030,374 A | * | 6/1977 | Isobe ................... | B62M 9/1342 474/82 |
| 4,194,409 A | * | 3/1980 | Nagano ................ | B62M 9/1342 474/80 |
| 4,756,704 A | * | 7/1988 | Nagano ................ | B62M 9/1342 474/144 |
| 5,037,355 A | * | 8/1991 | Kobayashi ........... | B62M 9/1342 474/82 |
| 5,779,581 A | * | 7/1998 | Fujii ...................... | B62M 9/136 474/80 |

(Continued)

FOREIGN PATENT DOCUMENTS

CN    204916040 U    12/2015

OTHER PUBLICATIONS

Italian Search Report and Written Opinion in Italian Application No. 102017000015324, dated Oct. 17, 2017, with English translation.

*Primary Examiner* — Henry Y Liu
(74) *Attorney, Agent, or Firm* — Volpe and Koenig, P.C.

(57) ABSTRACT

A bicycle front derailleur that is movable between shift positions in association with an indexer. The inner mechanical end stop is adjusted at the first indexing position so there is no loosening of the control cable in the last downward gearshifting operation, with the benefit of an immediate and rapid response in the first upward gearshifting operation. The outer end stop is adjusted to interrupt the rotation of the cable-winding bush before it reaches the last indexing position. This pair of mechanical end stops limits the excursion of the derailleur to prevent it being able to shift the chain too much towards the frame or too much away from the frame, which ensures that the chain is not shifted beyond the gears.

20 Claims, 3 Drawing Sheets

(56) References Cited

U.S. PATENT DOCUMENTS

| | | | | |
|---|---|---|---|---|
| 5,816,966 A * | 10/1998 | Yang | B62M 9/1346 | 474/82 |
| 6,099,425 A * | 8/2000 | Kondo | B62M 9/137 | 474/127 |
| 6,234,927 B1 * | 5/2001 | Peng | B62M 9/1342 | 474/80 |
| 6,282,976 B1 * | 9/2001 | Jordan | B62K 23/04 | 474/82 |
| 6,471,610 B1 * | 10/2002 | Tseng | B62M 9/1342 | 474/80 |
| 6,623,389 B1 * | 9/2003 | Campagnolo | B62M 9/122 | 474/70 |
| 6,648,782 B2 * | 11/2003 | Valle | B62M 9/132 | 474/78 |
| 6,679,797 B2 * | 1/2004 | Valle | B62M 9/132 | 474/78 |
| 6,986,723 B2 * | 1/2006 | Valle | B62M 9/136 | 474/80 |
| 7,014,584 B2 * | 3/2006 | Nanko | B62M 9/1342 | 474/80 |
| 7,291,079 B2 * | 11/2007 | Ichida | B62M 9/132 | 474/80 |
| 7,341,532 B2 * | 3/2008 | Ichida | B62M 9/132 | 474/70 |
| 7,438,658 B2 * | 10/2008 | Tetsuka | B62M 9/1342 | 474/122 |
| 7,442,136 B2 * | 10/2008 | Ichida | B62M 9/132 | 474/80 |
| 7,503,863 B2 * | 3/2009 | Ichida | B62M 9/132 | 474/70 |
| 7,677,998 B2 * | 3/2010 | Tetsuka | B62M 9/1342 | 474/80 |
| 7,704,172 B2 * | 4/2010 | Tetsuka | B62M 9/135 | 403/59 |
| 7,704,173 B2 * | 4/2010 | Ichida | B62M 25/08 | 474/80 |
| 7,762,916 B2 * | 7/2010 | Ichida | B62M 9/1348 | 474/78 |
| 7,914,407 B2 * | 3/2011 | Fukushima | B62M 9/1344 | 474/80 |
| 8,029,396 B2 * | 10/2011 | Valle | B62M 9/1342 | 474/80 |
| 8,066,597 B2 * | 11/2011 | Sakaue | B62M 9/122 | 474/82 |
| 8,241,158 B2 * | 8/2012 | Ishikawa | B62M 25/08 | 474/80 |
| 8,282,519 B2 * | 10/2012 | Ichida | B62M 25/08 | 474/82 |
| 8,678,963 B2 * | 3/2014 | Kuwayama | B62M 9/1348 | 474/80 |
| 8,777,788 B2 * | 7/2014 | Kawakami | B62M 9/1344 | 474/80 |
| 9,303,763 B2 * | 4/2016 | Yamaguchi | F16H 61/68 | |
| 9,676,446 B2 * | 6/2017 | Pasqua | B62M 9/134 | |
| 2003/0027674 A1 * | 2/2003 | Valle | B62M 9/132 | 474/70 |
| 2004/0157690 A1 * | 8/2004 | Nankou | B62M 9/1342 | 474/80 |
| 2005/0239587 A1 * | 10/2005 | Ichida | B62M 9/122 | 474/82 |
| 2006/0058133 A1 * | 3/2006 | Tetsuka | B62M 9/1342 | 474/80 |
| 2006/0189422 A1 * | 8/2006 | Ichida | B62M 9/132 | 474/80 |
| 2008/0167148 A1 * | 7/2008 | Siah | B62M 9/1342 | 474/80 |
| 2008/0274845 A1 * | 11/2008 | Valle | B62M 9/1342 | 474/80 |
| 2009/0054182 A1 * | 2/2009 | Miki | B62K 23/06 | 474/80 |
| 2009/0191994 A1 * | 7/2009 | Takamoto | B62M 9/122 | 474/70 |
| 2009/0215561 A1 * | 8/2009 | Fukuda | B62M 9/122 | 474/82 |
| 2010/0075788 A1 * | 3/2010 | Wickliffe | B62M 9/1342 | 474/80 |
| 2013/0072333 A1 * | 3/2013 | Kuwayama | B62M 9/1348 | 474/82 |
| 2016/0075401 A1 * | 3/2016 | Kuwayama | B62M 9/1342 | 474/80 |

* cited by examiner

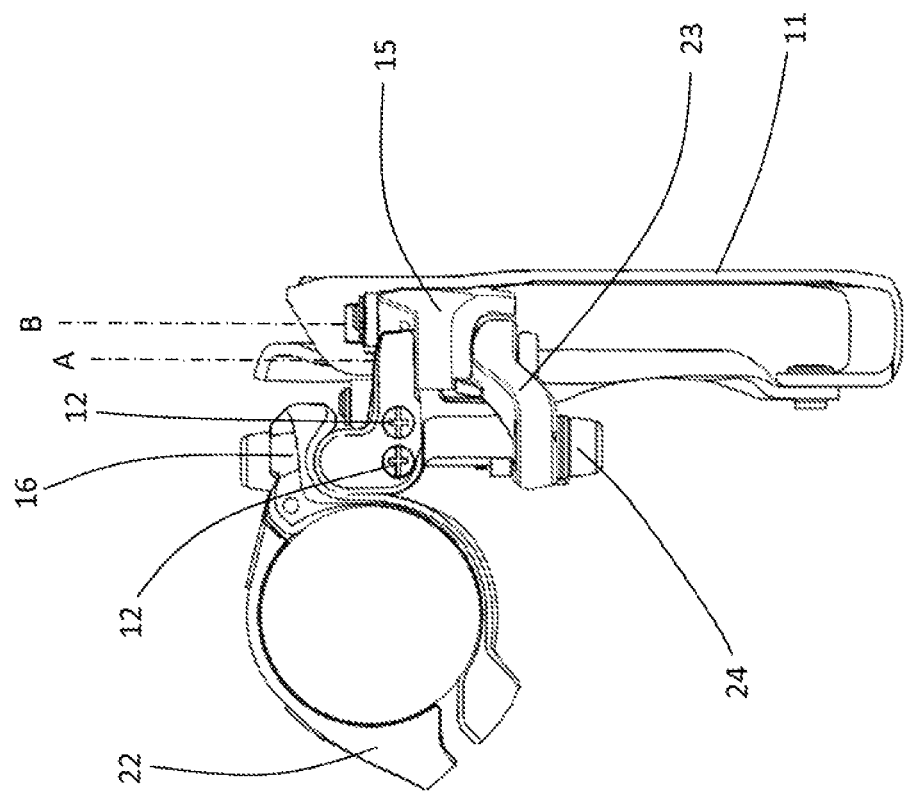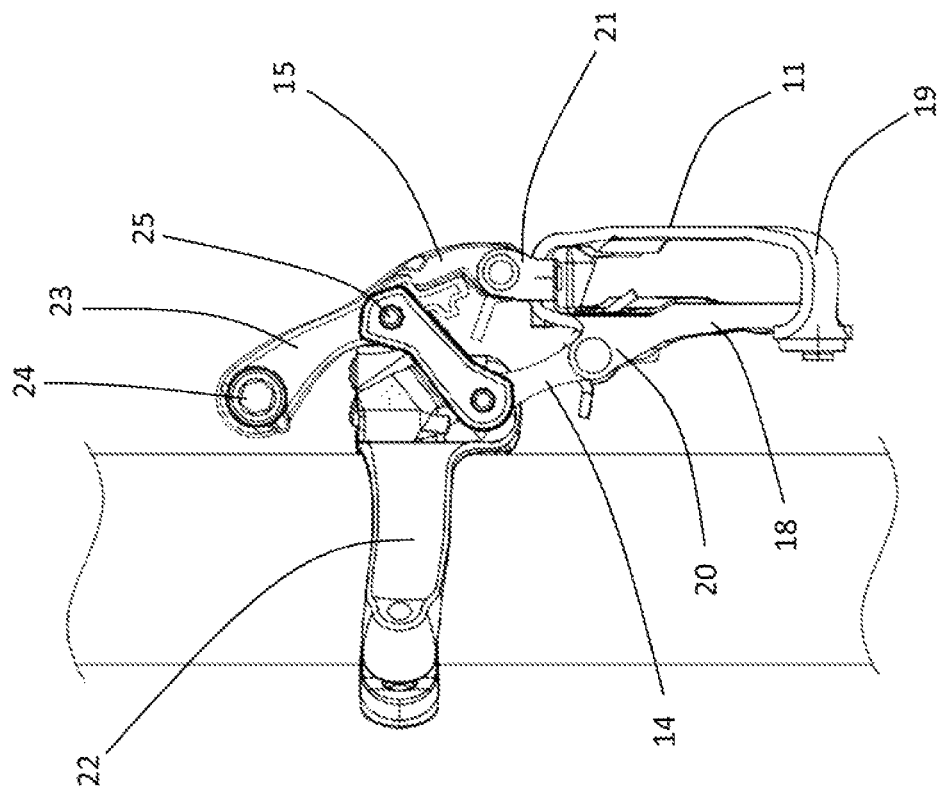

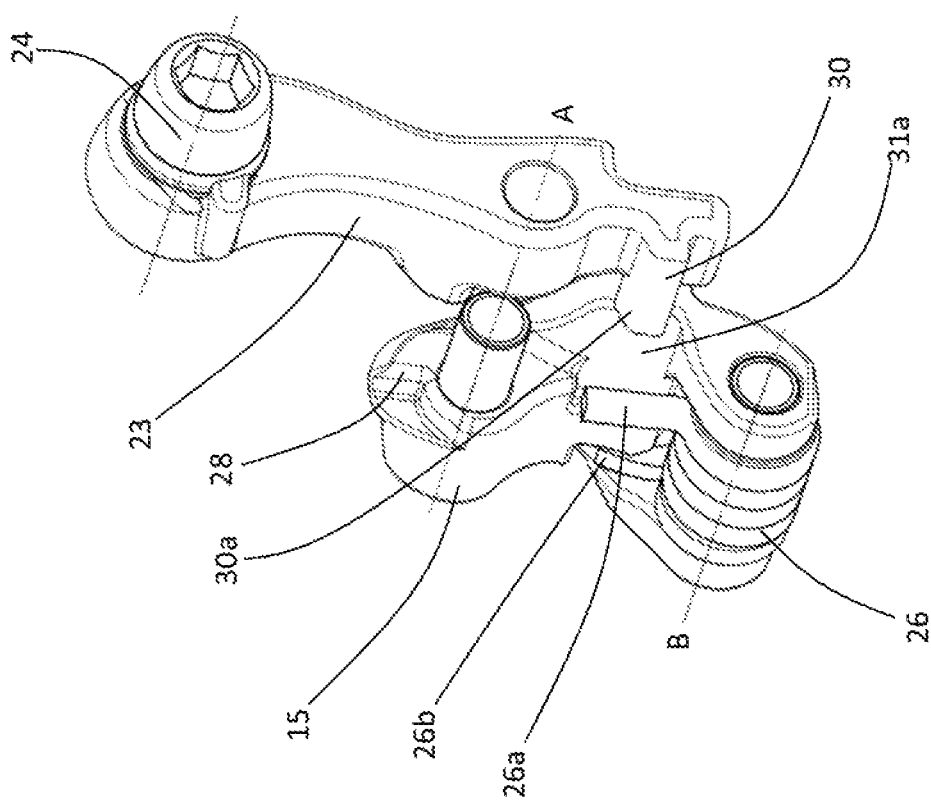
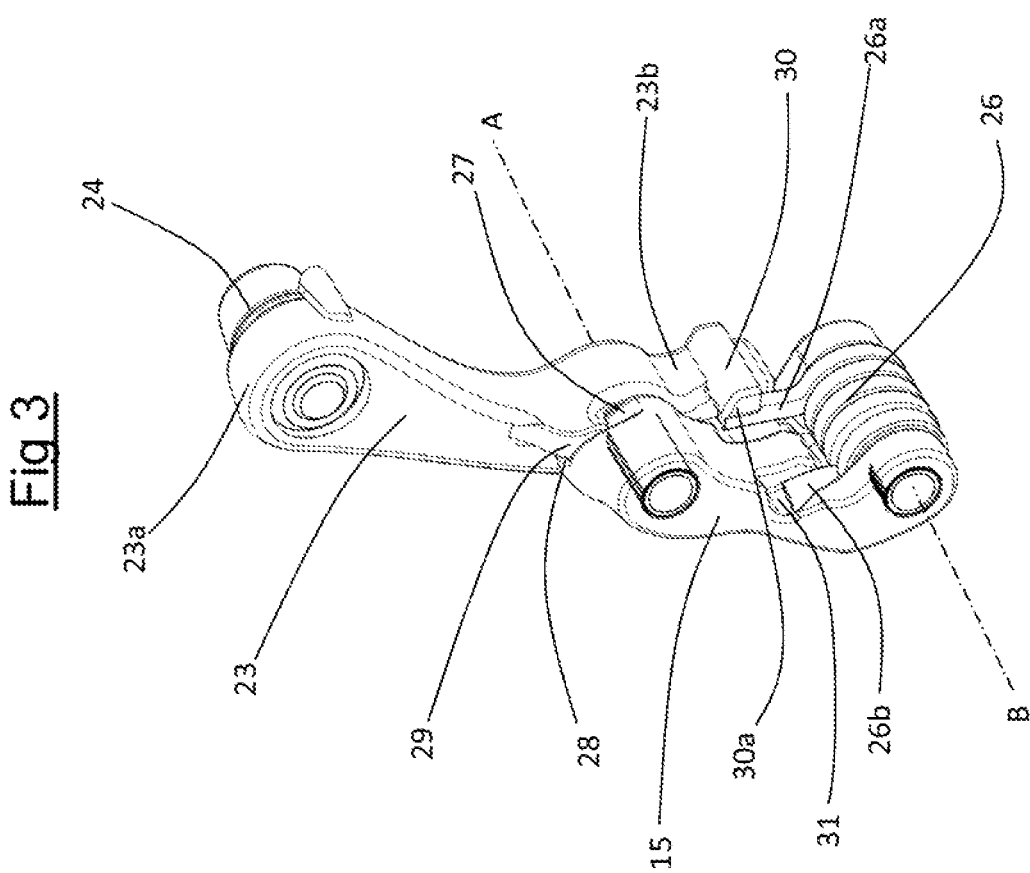

FRONT DERAILLEUR FOR A BICYCLE

CROSS REFERENCE TO RELATED APPLICATION(S)

This application claims the benefit of Italian Application No. 102017000015324, filed on Feb. 13, 2017, which is incorporated herein by reference as if fully set forth.

FIELD OF INVENTION

The present invention relates to a front derailleur for a bicycle, preferably a racing bicycle.

BACKGROUND

As known, front derailleurs are used to move the transmission chain from one crown gear of the crankset to another having a different diameter to carry out gearshifting, by changing the gear ratio.

Downward gearshifting is said when the chain passes from a crown gear having a larger diameter to a crown gear having a smaller diameter, and upward gearshifting is said when the chain moves from a crown gear having a smaller diameter to a crown gear having a larger diameter. Downward gearshifting therefore corresponds to the passage to a lower gear ratio and upward gearshifting corresponds to the passage to a higher gear ratio.

The movement of the front derailleur is obtained through an actuation device mounted on the handlebars so as to be easily maneuvered by the cyclist.

More specifically, in a mechanical gearshift, the front derailleur is moved between the crown gears of the crankset, upwards, by a traction action exerted by a normally sheathed inextensible control cable (commonly called Bowden cable), and downwards by the release of the traction of the control cable.

The derailleur comprises a chain guide (or cage) positioned above the transmission chain and a positioning mechanism of the chain guide that is fixed to the frame of the bicycle along the tube that connects the bottom bracket to the saddle (seat-tube).

The chain guide is formed from an inner plate and an outer plate facing one another and substantially parallel. The inner plate acts by thrusting on the chain to carry out the passage thereof from a crown having a small diameter to one having a larger diameter (upward gearshifting) and the outer plate acts by thrusting on the chain to carry out the passage thereof from a crown having a larger diameter to one having a smaller diameter (downward gearshifting).

The positioning mechanism of the chain guide is usually formed from a deformable articulated quadrilateral. Such an articulated quadrilateral comprises a fixed body (first side of the quadrilateral) fixedly connected to a strap for connection around the seat tube, by two connecting rods (inner connecting rod and outer connecting rod, which form another two sides of the quadrilateral) rotatably connected to the fixed body about two respective axes and by the body of the chain guide itself (which forms the fourth side and completes the articulated quadrilateral) rotatably connected to each of the two connecting rods about two further respective axes. The four axes are parallel to one another.

The outer connecting rod is hinged at the top to the fixed body about the first of the four axes and extends at the top beyond such an axis with an actuation arm to the end of which the control cable of the derailleur is connected. The control cable is usually connected to the end of the actuation arm laterally, so that the cable itself does not interfere with the positioning mechanism below.

When the control cable is pulled, the actuation arm is pulled and the outer connecting rod rotates about the first axis. The parallelogram is thus deformed, with the chain guide that is moved towards the outside of the bicycle to carry out gearshifting.

A return spring is usually active between the body of the chain guide and the inner connecting rod so as to counteract the tension of the control cable and translate the chain guide when the tension of the control cable is released.

In the actuation device, the control cable is actuated in traction or in release through winding and unwinding on a rotor element, commonly called cable-winding bush, the rotation of which is actuated by the cyclist with a suitable control lever, or with two control levers (a first lever for upward gearshifting and a second lever for downward gearshifting).

In any case, the actuation device must foresee for the cable-winding bush to be held in a number of predetermined angular positions, angularly spaced apart by predetermined indexing angles between a first and a last indexing position. This function is obtained with so-called indexers, many types of which are known in the field, variously active between the cable-winding bush and the fixed casing of the device.

A pair of mechanical end stops, and in particular an inner end stop and an outer end stop, limit the excursion of the derailleur to prevent it being able to shift the chain too much towards the frame or too much away from the frame (thus ensuring that the chain is not shifted beyond the crown gears).

Although the derailleur has a predetermined geometry, such as that summarily described above, its actual excursion following the actuation of the actuation device is a function of the actual mounting configuration of the derailleur and of the actuation device, said mounting configuration, although actuated within predetermined mounting tolerances, varying from one case to the next. For example, the actual force (or tension) transmitted by the control cable following the same rotation of the cable-winding bush depends (also) on the particular path followed by the control cable to reach the derailleur, on the way in which the control cable has been constrained to the actuation arm of the outer connecting rod and on many other factors linked to the installation of the derailleur and of the control device on the bicycle.

Clearly, such variations of the effective excursion of the derailleur are small in size, but sufficient to ensure that it is not possible to ensure that the total excursion of the derailleur (useful for carrying out all gearshifting operations) corresponds exactly to the angular excursion of the cable-winding bush between the first and the last indexing position.

The indexing positions and the relative controls are therefore sized so as the ensure correct gearshifting also in the most unfavorable mounting situation, implying that the angular distance between the first and the last indexing position corresponds to a useful stroke of the derailleur that is greater than what is actually necessary.

For this reason, the mechanical end stops of the derailleur are usually adjusted so that the outer end stop acts as a stop for the excursion of the derailleur when the cable-winding bush is held in the last indexing position, in other words in the indexing position reached after the last upward gearshifting.

In this way, it is possible to ensure for the cyclist that the last upward gearshifting operation, corresponding to the maximum tension of the control cable, is obtained and stably maintained.

The inner end stop is adjusted to ensure that the derailleur is positioned on the smallest toothed wheel of the crankset avoiding sliding of the transmission chain on the derailleur when the transmission chain is engaged on the largest toothed wheel of the rear cassette.

In this way, the excursion of the derailleur is stopped before the cable-winding bush reaches the first indexing position. However, the action exerted by the cyclist on the control in any case carries the cable-winding bush into the first indexing position, making the gearshifting stable. Indeed, in this situation (downward gearshifting) the rotation of the cable-winding bush towards the first indexing position causes a loosening of the control cable thus therefore does not offer any resistance to the rotation of the cable-winding bush.

SUMMARY

The Applicant has noted that the adjustment of the aforementioned mechanical end stops of the derailleur results in a lower responsiveness at least in the first upward gearshifting operation. This is since the first part of the first upward gearshifting does not cause any movement of the derailleur and has the sole purpose of recovering the tension of the control cable.

The Applicant has perceived that by adjusting the inner mechanical end stop exactly at the first indexing position there would be no loosening of the control cable in the last downward gearshifting operation, with consequent immediate and rapid response in the first upward gearshifting operation.

The Applicant has however found that in this way the outer mechanical end stop should be adjusted so as to interrupt the rotation of the cable-winding bush before it reaches the last indexing position. The reaching of the stable position of the cable-winding bush on the last indexing position would be strongly counteracted by the fact that the control cable should be wound further on the cable-winding bush with the derailleur impeded by the outer end stop to carry out a further translation.

BRIEF DESCRIPTION OF THE DRAWINGS

The features and advantages of the invention will become clearer from the following description of preferred embodiments thereof, made with reference to the attached drawings. In such drawings:

FIG. 2 is a side view of the derailleur of FIG. 1 mounted on a tube of a bicycle;

FIG. 3 is a perspective view of a detail of the derailleur of FIG. 1;

FIG. 4 is a view from above of the derailleur of FIG. 2 and

FIG. 5 is a partially exploded view of some details of the derailleur of FIG. 1.

DETAILED DESCRIPTION OF THE PREFERRED EMBODIMENTS

Figure 1:
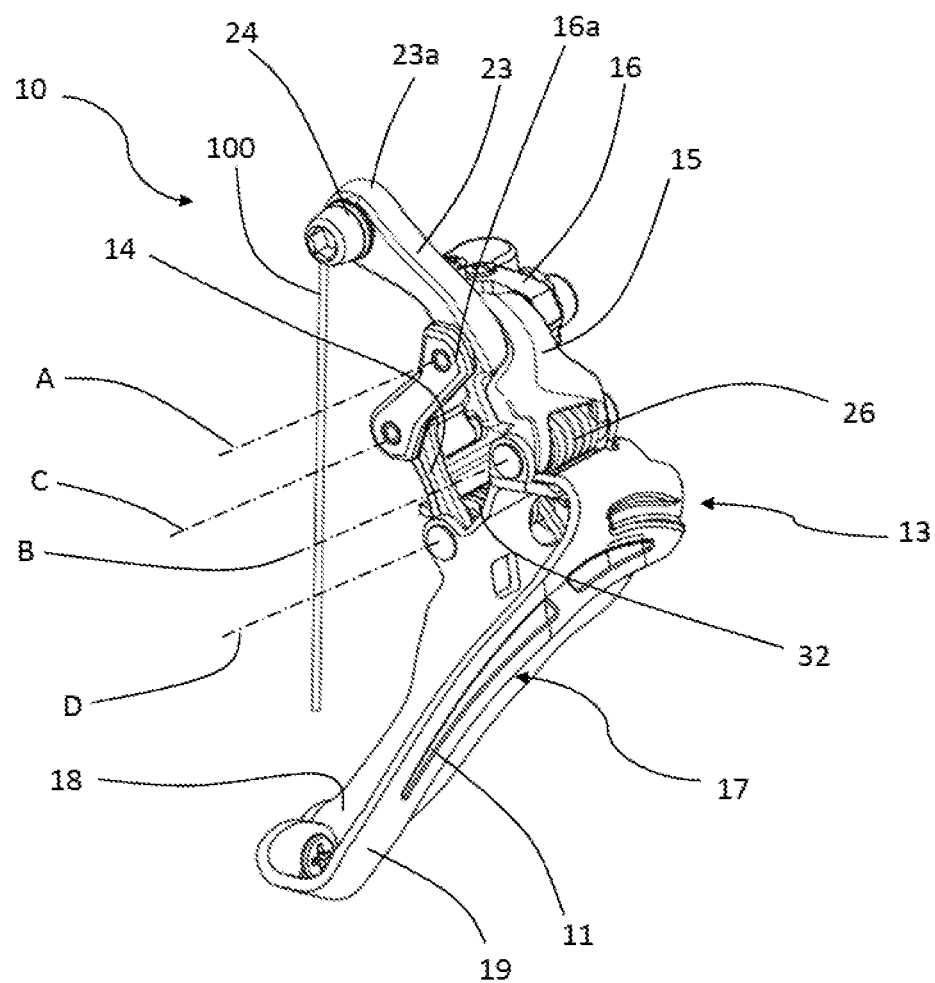
FIG. 1 is a perspective view of a front derailleur for a bicycle according to the invention.

The present invention therefore relates to a front derailleur for a bicycle comprising:

a movable body, provided with a chain guide configured to interact with a transmission chain of the bicycle and movable between a plurality of positions comprised between an inner position and an outer position;

a fixed body, adapted for being fixed to a part of frame of the bicycle;

an outer connection element hinged to the fixed body about a first articulation axis and hinged to the movable body about a second articulation axis;

an inner connection element hinged to the fixed body about a third articulation axis and hinged to the movable body about a fourth articulation axis;

a return member active between the movable body and the inner connection element to push said chain guide into said inner position;

an actuation arm hinged to the fixed body about said first articulation axis and comprising a fastener for a control cable arranged moving away from the first articulation axis on the opposite side with respect to the second articulation axis;

said actuation arm and said outer connection element being rigidly connected to make a rocker arm when the force exerted on said fastener is such as to determine a movement of the chain guide between the inner position and the outer position, said actuation arm rotating with respect to said outer connection element when the force exerted on said fastener is greater than the force necessary to hold the chain guide in the outer position.

The rotation of the actuation arm with respect to the outer connection element only takes place when the force exerted on said fastener is greater than the force necessary to move the chain guide into the outer position.

When a force equal to or less than that necessary to move the chain guide into the outer position is transmitted to the fastener, the articulation arm is fixedly connected to the outer connection element and does not rotate with respect to it.

The outer position of the chain guide corresponds to a positioning of the transmission chain at the largest toothed wheel of the crankset.

The inner position of the chain guide corresponds to a positioning of the transmission chain at the smallest toothed wheel of the crankset.

The passage of the chain guide between the inner position and the outer position determines upward gearshifting.

The rigid coupling between the actuation arm and the outer connection element ensures that the force exerted by the traction of the control cable on the actuation arm moves the chain guide towards the outer position thereof.

The greater the traction force of the control cable, the greater the movement of the chain guide towards the outer position, with consequent movements of the transmission chain to carry out upward gearshifting.

The Applicant has noted that by making the actuation arm rotatable with respect to the outer connection element, the force exerted by the traction cable on the actuation arm has no effect on the movement of the chain guide, but in any case actuates a rotation of the cable-winding bush.

The Applicant has perceived that by making the actuation arm rotatable with respect to the outer connection element only when the traction exerted by the control cable on the actuation arm is greater than the force necessary to hold the chain guide in the outer position, the inner position of the chain guide can be made to correspond exactly, in the mounting and adjustment step of the derailleur, to the first indexing position of the cable-winding bush. This allows the control cable to maintain a tension, even if minimal, when the cable-winding bush is in the first indexing position, allowing a rapid and reactive first upward gearshifting operation.

The Applicant has indeed found that if the last indexing position is also not reached by rotating the cable-winding bush to take the chain guide into the outer position, the cable-winding bush can be further rotated without causing a further movement of the chain guide, by means of the rotation of the actuation arm with respect to the outer connection element, and reaching the last indexing position.

Such a further rotation of the cable-winding bush indeed determines a greater traction of the control cable that only sets the actuation arm in rotation with respect to the outer connection element. The further rotation of the cable-winding bush is thus not prevented by jamming or mechanical blocks and can be actuated easily, simply and with an effort from the cyclist slightly greater than the effort necessary to take the chain guide into the outer position.

The front derailleur of a bicycle of the present invention can comprise one or more of the following preferred features, taken individually or in combination.

Preferably, said fixed body, said movable body, said inner connection element and said outer connection element define an articulated quadrilateral deformable by said elastic return member to move said chain guide from the outer position to the inner position and deformable by said actuation arm to move said chain guide from the inner position to the outer position.

This movement linkage of the chain guide is simple and reliable and allows correct operation of the derailleur over time.

The traction of the control cable on the fastener of the actuation arm deforms the articulated quadrilateral, since the actuation arm (when fixedly connected to the outer connection element) and the outer connection element act as a rocker arm that rotates about the first articulation axis moving the second articulation axis and thus deforming the articulated quadrilateral towards the outer position of the chain guide.

Preferably, an elastic member is active between said outer connection element and said actuation arm, said elastic element elastically yielding when a force applied to said actuation arm is greater than the force necessary to deform said articulated quadrilateral to take the chain guide into the outer position.

In this way, an elastic member can be selected that has elastic properties such as to allow the elastic deformation thereof (and cause the rotation of the actuation arm with respect to the outer connection element) only when the forces acting on it exceed a predetermined threshold. Such a predetermined threshold is indicative of the force necessary to deform the articulated quadrilateral to take the chain guide into the outer position.

The term "elastic deformation", in the present description and in the attached claims, is meant to indicate a deformation that disappears when the stress stops. The term "accumulated" or "stored" elastic energy and similar, is meant to indicate the increase in potential energy of the elastic member during the elastic deformation. Equally, the term elastic energy "released" and similar is meant to indicate the decrease in potential energy of the elastic member to take it back into the condition prior to the start of the deformation.

Preferably, said elastic member comprises a torsion spring arranged at said second articulation axis.

Preferably, said torsion spring of the elastic member is mounted with a torsional preload between the actuation arm and the outer connection element; said preload of the torsional spring applying a force onto said actuation arm that tends to make it rotate about the first articulation axis in an opposite angular direction with respect to the rotation of the first actuation arm about the first articulation axis when subjected to a traction force of the control cable.

The term "preload", in the present description and in the attached claims, is meant to indicate a permanent load that is applied to the torsional spring before the application of the operating load, in other words before the application of the torque transmitted by the tension of the control cable.

In this way, the force transmitted by the preload of the torsion spring opposes the rotation of the articulation arm with respect to the outer connection element when the derailleur is actuated.

Preferably, said outer connection element comprises a shoulder engageable in abutment by a protrusion of the actuation arm; said shoulder and said protrusion being arranged on the opposite side to the first articulation axis with respect to said torsional spring.

In this way, the thrust exerted by the preload of the torsional spring is compensated by the mechanical interaction between shoulder and protrusion, making the articulation arm and the outer connection element fixedly connected to one another until the torsion spring elastically deforms.

Indeed, the rotation of the articulation arm under the thrust of the preload of the spring is in an opposite angular direction with respect to the angular direction with respect to which the articulation arm rotates with respect to the outer connection element when the torsional spring elastically deforms by means of the traction force exerted on the fastener of the actuation arm by the control cable.

Preferably, said return member comprises a torsional return spring; the torque to be applied to the torsion spring of the elastic member to cause a rotation of the actuation arm with respect to the outer connection element being greater than the torque to be applied to the torsional return spring to cause a rotation of the movable body with respect to the inner connection element.

In this way, the actuation arm becomes rotatable with respect to the outer connection element only when the movable body, and with it the chain guide, has been rotated with respect to the inner connection element, more preferably only when the movable body has ended its maximum rotation with respect to the inner connection element.

Preferably, an articulation pin is arranged at said first articulation axis, said outer connection element and said actuation arm being crossed by said articulation pin; said actuation arm comprising an appendage distal from said articulation pin and facing towards said second articulation axis.

Preferably, said torsion spring of the elastic member comprises a first end abutting on said appendage of the actuation arm and a second end abutting in a seat of the outer connection element.

The torsion spring of the elastic member is thus preferably active directly on both the actuation arm and the outer connection element.

Preferably, said torsion spring of the elastic member is mounted with a torsional preload between the actuation arm and the outer connection element; said torsional preload being greater than the torsional load to be applied to the torsional return spring to move the chain guide in outer position.

In any case, the torsional spring of the elastic member must deform only after the articulated quadrilateral has taken the chain guide into the outer position.

Preferably, said appendage of the actuation arm comprises a projection having an abutment surface facing towards said outer connection element; said abutment surface defining an end stop for the rotation of the actuation arm with respect to the outer connection element when the torsional spring of the elastic member is elastically deformed.

Preferably, the actuation arm and the outer connection element are contained in a fork of the fixed body at the first articulation axis.

In this way, the fork of the fixed body embraces and contains in its bulk both the actuation arm and the outer connection element.

Preferably, between said fork of the fixed body, said actuation arm and said outer connection element there are no clearances in the direction of the first articulation axis.

Preferably, the force to be applied to said fastener of the actuation arm to move the chain guide from the inner position to the outer position is contained in a plane perpendicular to the first articulation axis and is directed towards the first articulation axis.

The force applied to the fastener of the actuation arm has a component perpendicular to the actuation arm and a component parallel to the actuation arm.

Preferably, the component perpendicular to the actuation arm progressively increases as the chain guide moves towards the outer position and the component parallel to the actuation arm progressively decreases as the chain guide moves towards the outer position.

Preferably, the distance between the fastener of the actuation arm and the first articulation axis remains constant during the rotation of the actuation arm with respect to the outer connection element.

In this way, the control cable transmits torque to the elastic member that progressively increases as the chain guide moves towards the outer position.

With reference to the attached figures, a preferred embodiment of the front derailleur for a bicycle in accordance with the present invention is shown. The derailleur is wholly indicated with 10.

The front derailleur 10 is preferably a mechanical derailleur, in other words it does not need any electric and/or electronic device for its operation.

The derailleur 10 comprises a chain guide 11, which is configured to slidably engage a transmission chain of the bicycle (not illustrated) to move it from an inner position to an outer position passing through a plurality of intermediate positions between them.

Predetermined positions of the chain guide 11 correspond to predetermined positions of the transmission chain on the crown gears of the crankset.

In particular, the inner position of the chain guide 11 corresponds to a position of the transmission chain on the smallest crown gear of the crankset and the outer position corresponds to a position of the transmission chain on the largest crown gear of the crankset.

The derailleur 10 comprises an inner end stop and an outer end stop (not illustrated) to limit the excursion of the chain guide 11. The inner and outer end stops are adjustable by acting on screws 12 arranged on the derailleur 10 (as illustrated in FIG. 4). In particular, when the chain guide 11 is in the inner position, further movements in the inner direction of the chain guide 11 are mechanically impeded by the inner end stop. When the chain guide 11 is in the outer position, further movements in the outer direction of the chain guide 11 are mechanically impeded by the outer end stop.

The movement of the chain guide 11 is actuated by a deformable quadrilateral 13. The deformable quadrilateral 13 comprises an inner connection element 14, an outer connection element 15, a fixed body 16 and a movable body 17. The chain guide 11 is fixedly connected to the movable body 17 of the deformable quadrilateral 13.

The fixed body 16, the movable body 17 and the two connection elements 14, 15 are articulated to one another along four articulation axes A, B, C, D that are parallel to each other. More precisely, the fixed body 16 and the outer connection element 15 are articulated to one another according to a first articulation axis A; the outer connection element 15 and the movable body 17 are articulated to one another according to a second articulation axis B; the fixed body 16 and the inner connection element 14 are articulated to one another according to a third articulation axis C; the inner connection element 14 and the movable body 17 are articulated to one another according to a fourth articulation axis D.

The movable body 17 comprises an inner plate 18 facing an outer plate 19 that make the chain guide 11. The movable body 17 is further provided with first flanges 20 perforated along the fourth articulation axis D for the connection to the inner connection element 14 and with second flanges 21 for the connection to the outer connection element 15.

Kinematically, the inner and outer connection elements 14, 15 are connecting rods, in other words they are elements that are not able to transmit torque to the elements to which they are connected along the respective articulation axes.

The fixed body 16 comprises a collar 22 for attaching to a portion of the seat tube of the frame of the bicycle, as schematically illustrated in FIG. 2. The collar 22 allows the derailleur 10 to take up and maintain a predetermined position with respect to the crankset.

In embodiments that are not illustrated, the fixed body 16 can be fixedly connected to the seat tube of the frame of the bicycle without using the collar 22, for example by welding the fixed body to the seat tube of the frame or by constraining the fixed body 16 to an appendage directly formed in the seat tube of the frame.

The derailleur 10 further comprises an actuation arm 23 hinged to the fixed body 16 about the first articulation axis A.

The actuation arm 23 comprises, at a first free end 23a, a fastener 24 for a control cable 100 (FIG. 1). A second end 23b of the actuation arm 23 is arranged on the opposite side to the first articulation axis A with respect to the fastener 24.

At the first articulation axis A there is an articulation pin 25 which passes through the fixed body 16, the first outer connection element 15 and the actuation arm 23.

Concerning this, the fixed body 16 comprises a fork 16a at the first articulation axis A which receives and embraces the outer connection element 15 and the actuation arm 23, so that the latter are constrained in the direction of the first articulation axis A and cannot move in such a direction.

Between the actuation arm 23 and the outer connection element 15 there is a torsional spring 26 which is mounted with a preload to exert a thrust on the second end 23b of the actuation arm 23.

The thrust exerted by the preload of the torsional spring 26 tends to rotate the actuation arm 23 in a first angular direction about the first articulation axis A.

The outer connection element 15 comprises a groove 27 equipped with a shoulder 28 arranged above the first articulation axis A, in other words on the opposite side to the first articulation axis A with respect to the second articulation axis B (FIGS. 3 and 5).

The groove 27 is engaged by a protrusion 29 of the actuation arm 23.

The thrust exerted by the torsional spring 26 takes the protrusion 29 into abutment against the shoulder 28.

The rotation about the first articulation axis A of the actuation arm 23 with respect to the outer connection element 15 is counteracted in the first angular direction by the abutment of the protrusion 29 against the shoulder 28, and in a second angular direction, opposite to the first, by the elastic resistance offered by the torsional spring 26.

The actuation arm 23 is therefore rotatable with respect to the outer connection element 15 along the second angular direction only when the torsional spring 26 is elastically deformed.

Concerning this, when the control cable 100 is placed under traction by the cyclist, a force is transmitted to the actuation arm 23 that tends to elastically deform the torsional spring 26 and rotate the actuation arm 23 in the second angular direction.

When such a force transmitted by the control cable 100 is not sufficient to elastically deform the torsion spring 26, the actuation arm 23 and the outer connection element 15 do not rotate with respect to one another and define a rocker arm that is rotatable about the first articulation axis A.

In such a condition, the articulated quadrilateral 13 deforms by means of the rotation of the rocker arm moving the chain guide 11 towards the outer position.

When the force transmitted by the control cable 100 exceeds a predetermined limit, the torsional spring 26 elastically deforms and the actuation arm 23 rotates in the second angular direction about the first articulation axis A with respect to the outer connection element 15.

The limit beyond which the force transmitted by the control cable 100 elastically deforms the torsional spring 26 is given by the force transmitted by the control cable 100 necessary to rotate the rocker arm and take the chain guide 11 into the outer position.

As shown in FIG. 3, the torsional spring 26 comprises a first stem 26a abutting on an appendage 30 of the actuation arm 23 arranged at the second end 23b thereof.

The appendage 30 has a projection 30a having an abutment surface facing towards the outer connection element 15.

A second stem 26b of the torsional spring 26 abuts in a seat 31 of the outer connection element 15.

The torsional spring 26 is crossed by a pin that defines the second articulation axis B.

In order to take the chain guide 11 back towards the inner position upon release of the control cable 100, a torsional return spring 32 is foreseen (FIG. 1) arranged on the fourth articulation axis D and active between the movable body 17 and the inner connection element 14.

Such a torsional return spring 32 exerts a resistance, elastically deforming, in the passage of the chain guide 11 from the inner position to the outer position, therefore requiring that a predetermined force is transmitted to the actuation arm 23 by the control cable 100 to move the chain guide 11 from the inner position to the outer position. The elastic deformation of the torsional return spring 32 is recovered in the passage from the outer position to the inner position of the chain guide 11.

The torsional spring 26 is selected so that it does not deform when the torsional return spring 32 deforms in the passage from the inner position to the outer position of the chain guide 11.

This ensures that during the entire excursion of the chain guide 11 from the inner position to the outer position, the actuation arm 23 and the outer connection element 15 behave like a rocker arm.

When the cyclist wishes to carry out upward gearshifting, he/she actuates the control arranged on the handlebars of the bicycle to set the cable-winding bush in rotation and tighten the control cable 100.

The tension of the control cable 100 is transmitted to the actuation arm 23 setting the latter and the outer connection element 15 in rotation with respect to the first articulation axis A.

Such a rotation determines the deformation of the deformable quadrilateral 13 and moves the chain guide towards the outer position.

In this condition, the actuation arm 23 and the outer connection element 15 are fixedly connected, since the tension exerted by the control cable is not able to deform the torsional spring 26.

The deformation of the deformable quadrilateral takes place in contrast to the torsional return spring 32 which deforms storing elastic energy.

The cable-winding bush reaches a stable position on the indexer and the system locks in the position reached.

When, following the last upward gearshifting operation, the chain guide 11 is in the outer position, a further actuation of the control determines further rotation of the cable-winding bush that is positioned in the last stable indexing position. The further traction force exerted by the control cable 100 on the actuation arm 23 (caused by the further rotation of the cable-winding bush) determines the elastic deformation of the torsional spring 26 with the consequent rotation of the actuation arm 23 in the second angular direction with respect to the outer connection element 15.

It should be noted that the rotation of the actuation arm 23 with respect to the outer connection element 15 does not cause any change in position of the articulated quadrilateral 13.

The rotation of the actuation arm 23 with respect to the outer connection element 15 is limited by the abutment of the projection 30a of the appendage 30 of the actuation arm 23 on an abutment surface 31a of the outer connection element 15, shown in FIG. 5, directly facing the appendage 30.

Such a limit in the rotation of the actuation arm 23 with respect to the outer connection element 15 is in any case sufficient to make the cable-winding bush carry out a rotation sufficient to make them reach the last stable position on the indexer.

During the first downward gearshifting operation from the stable position of last upward gearshifting, the release of the control cable 100 determines the release of the elastic energy stored in the torsional spring 26 that sets the actuation arm 23 in rotation with respect to the outer connection element 15 in the first angular direction until the protrusion 29 goes back into abutment against the shoulder 28.

Further releases of the control cable 100 determine downward gearshifting operations or determine repositioning of the chain guide 11 on the same crown gear to better adjust the position of the transmission chain on it. During such downward gearshifting, the actuation arm 23 and the outer connection element 15 remain fixedly connected for rotations about the first articulation axis A.

Of course, those skilled in the art can bring numerous modifications and variants to the invention described above, in order to satisfy specific and contingent requirements, like for example foreseeing different positions for the torsional spring 26, all in any case contained in the scope of protection of the present invention as defined by the following claims.

What is claimed is:

1. A front derailleur for a bicycle, comprising:
   a movable body, provided with a chain guide configured to interact with a transmission chain of the bicycle and movable between a plurality of positions comprised between an inner position and an outer position;
   a fixed body, adapted for being fixed to a part of frame of the bicycle;
   an outer connection element hinged to the fixed body about a first articulation axis and hinged to the movable body about a second articulation axis;
   an inner connection element hinged to the fixed body about a third articulation axis and hinged to the movable body about a fourth articulation axis;
   a return member active between the movable body and the inner connection element to push said chain guide in said inner position; and
   an actuation arm hinged to the fixed body about said first articulation axis and comprising a fastener for a control cable arranged to move away from the first articulation axis on an opposite side with respect to the second articulation axis;
   said actuation arm and said outer connection element being rigidly connected to make a rocker arm when a force exerted on said fastener is such as to determine a movement of the chain guide between the inner position and the outer position, said actuation arm rotating with respect to said outer connection element when a force exerted on said fastener is greater than a force necessary to hold the chain guide in the outer position.

2. The front derailleur according to claim 1, wherein said fixed body, said movable body, said inner connection element and said outer connection element define an articulated quadrilateral deformable by said return member to move said chain guide from the outer position to the inner position and deformable by said actuation arm to move said chain guide from the inner position to the outer position.

3. The front derailleur according to claim 2 further comprising an elastic member active between said outer connection element and said actuation arm, said elastic member elastically yielding when a force applied to said actuation arm is greater than a force necessary to deform said articulated quadrilateral to take the chain guide into the outer position.

4. The front derailleur according to claim 3, wherein said elastic member comprises a torsion spring arranged at said second articulation axis.

5. The front derailleur according to claim 4, wherein said torsion spring of the elastic member is mounted with a torsional preload between the actuation arm and the outer connection element; said preload of the torsion spring applying a force on said actuation arm that tends to rotate it about the first articulation axis in an opposite angular direction with respect to the rotation of the first actuation arm about the first articulation axis when subjected to a traction force of the control cable.

6. The front derailleur according to claim 5, wherein said outer connection element comprises a shoulder engageable in abutment by a protrusion of the actuation arm; said shoulder and said protrusion being arranged on the opposite side to the first articulation axis with respect to said torsional spring.

7. The front derailleur according to claim 4, wherein said return member comprises a torsion return spring; a torque to be applied to the torsion spring of the elastic member to cause a rotation of the actuation arm with respect to the outer connection element is greater than a torque applied to the torsion return spring to cause a rotation of the movable body with respect to the inner connection element.

8. The front derailleur according to claim 4 further comprising an articulation pin arranged at said first articulation axis, said outer connection element and said actuation arm being crossed by said articulation pin; and said actuation arm comprising an appendage that extends away from said articulation pin towards said second articulation axis.

9. The front derailleur according to claim 8, wherein said torsion spring of the elastic member comprises a first end abutting on said appendage of the actuation arm and a second end abutting in a seat of the outer connection element.

10. The front derailleur according to claim 7, wherein said torsion spring of the elastic member is mounted with a torsional preload between the actuation arm and the outer connection element; said torsional preload being greater than a torsional load to be applied to the torsion return spring of the return member to move the chain guide into outer position.

11. The front derailleur according to claim 8, wherein said appendage of the actuation arm comprises a projection facing towards said outer connection element; said projection defining an end stop block for the rotation of the actuation arm with respect to the outer connection element.

12. The front derailleur according to claim 1, wherein a force applied to said fastener of the actuation arm to move the chain guide from the inner position to the outer position is contained in a plane perpendicular to the first articulation axis.

13. The front derailleur according to claim 1, wherein a distance between the fastener of the actuation arm and the first articulation axis remains constant during the rotation of the actuation arm with respect to the outer connection element.

14. The front derailleur according to claim 5, wherein said return member comprises a torsional return spring; a torque to be applied to the torsion spring of the elastic member to cause a rotation of the actuation arm with respect to the outer connection element is greater than a torque applied to the torsional return spring to cause a rotation of the movable body with respect to the inner connection element.

15. The front derailleur according to claim 14 further comprising an articulation pin arranged at said first articulation axis, said outer connection element and said actuation arm being crossed by said articulation pin; and said actuation arm comprising an appendage that extends away from said articulation pin towards said second articulation axis.

16. The front derailleur according to claim 6, wherein said return member comprises a torsional return spring; a torque to be applied to the torsion spring of the elastic member to cause a rotation of the actuation arm with respect to the outer connection element is greater than a torque applied to the torsional return spring to cause a rotation of the movable body with respect to the inner connection element.

17. The front derailleur according to claim 16 further comprising an articulation pin arranged at said first articulation axis, said outer connection element and said actuation arm being crossed by said articulation pin; and said actuation arm comprising an appendage that extends away from said articulation pin towards said second articulation axis.

18. The front derailleur according to claim 2, wherein a force applied to said fastener of the actuation arm to move the chain guide from the inner position to the outer position is contained in a plane perpendicular to the first articulation axis.

19. The front derailleur according to claim 18, wherein a distance between the fastener of the actuation arm and the first articulation axis remains constant during the rotation of the actuation arm with respect to the outer connection element.

20. The front derailleur according to claim 2, wherein a distance between the fastener of the actuation arm and the first articulation axis remains constant during the rotation of the actuation arm with respect to the outer connection element.

* * * * *